July 30, 1935.    N. B. HENRY    2,009,927
COTTON DISTRIBUTOR AND THE LIKE
Filed March 5, 1931    2 Sheets-Sheet 1
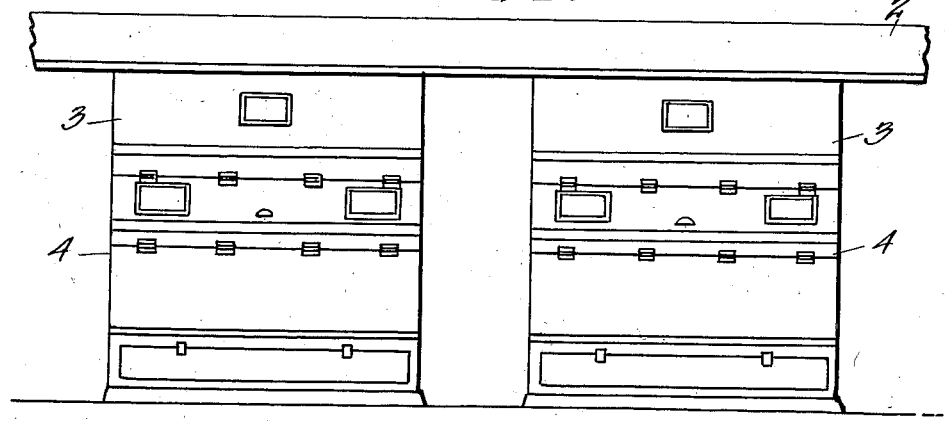
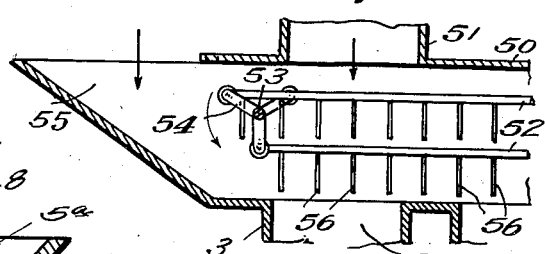
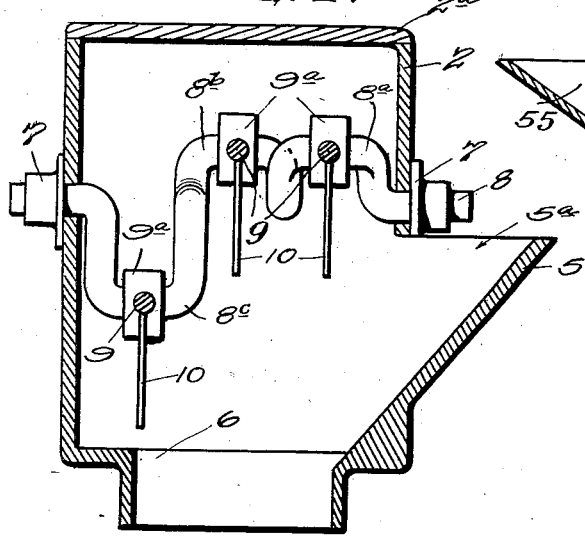
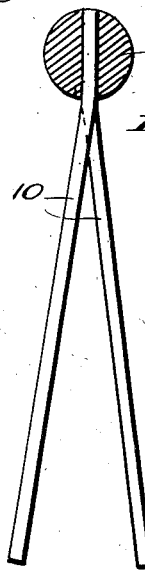
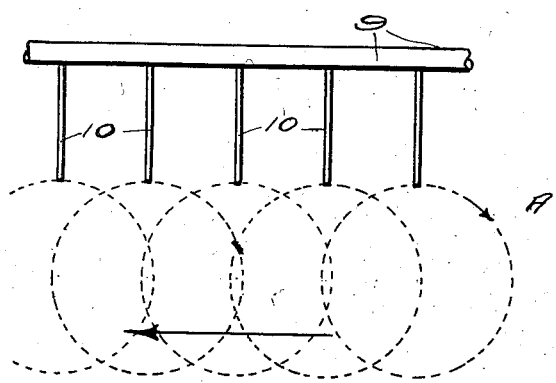
Inventor
N. B. Henry
By Eugene G. Stevens
His Attorney

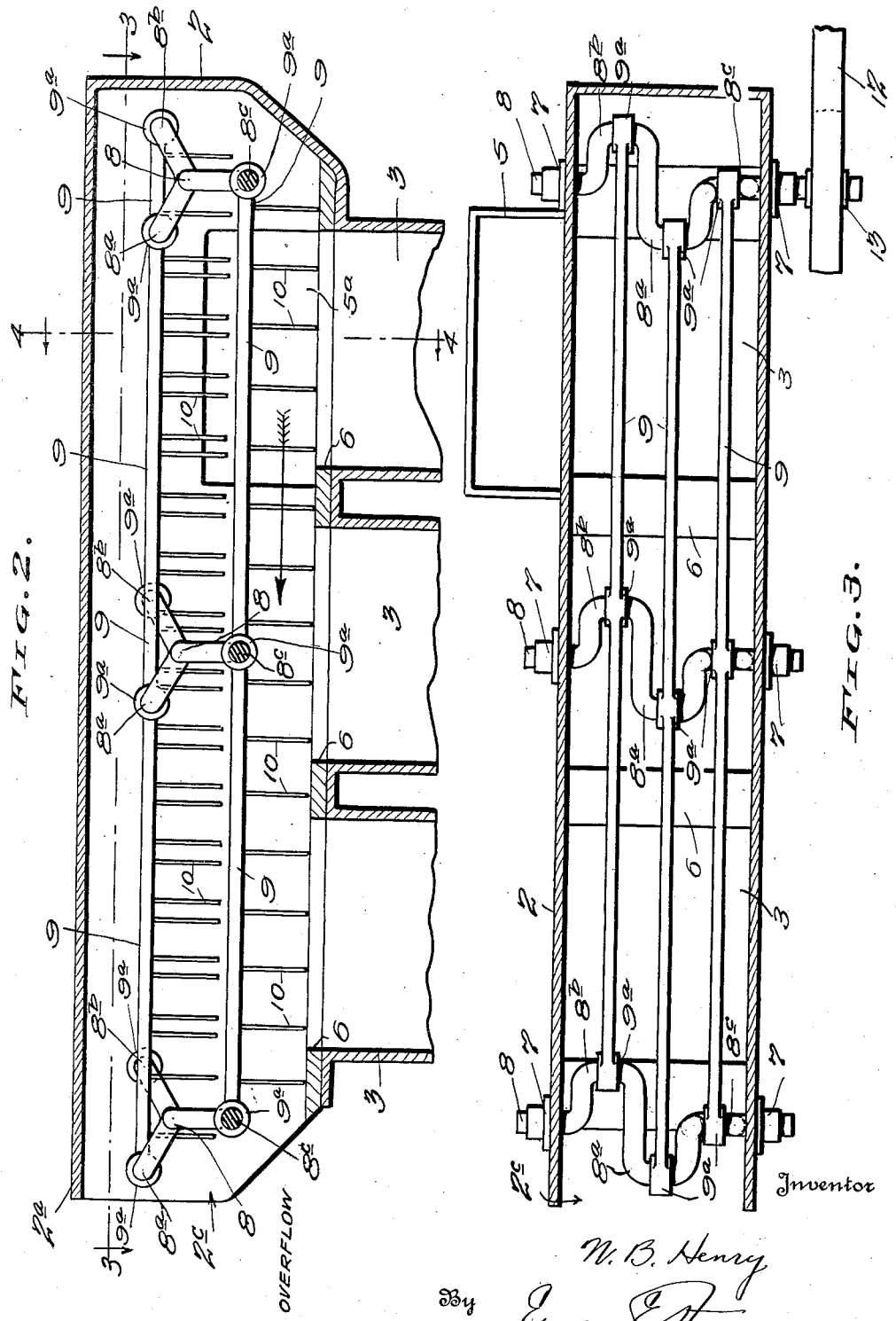

Patented July 30, 1935

2,009,927

UNITED STATES PATENT OFFICE 2,009,927

COTTON DISTRIBUTOR AND THE LIKE

Nelson B. Henry, Columbus, Ga.

Application March 5, 1931, Serial No. 520,430

15 Claims. (Cl. 19—74)

My invention relates to improvements in distributors for supplying cotton to a battery of gins, feeders or feeder hoppers and for other purposes.

Heretofore it has been the practice to supply the cotton to a battery of gin feeders by means of a belt distributor, or by means of a screw conveyor distributor. Both of these types have been found unsatisfactory in many particulars.

With reference to the belt type of distributor, it is very difficult to maintain the belt and its supporting pulleys in exact alignment. The belt often rubs against the side of the trough with resulting objectionable wear and friction. In fact, the friction will often be sufficient to set the cotton in the distributor on fire.

Also, the cotton engaging spikes of the belt frequently work loose passing through the feeders and into the gins with considerable damage to the saws.

Another objection to the belt distributor is that the belt traveling continuously free in one direction at a rate of several hundred feet per minute tends to bank, or pack, the cotton up in the remote ends of the respective feeders or hoppers in the battery. The result of this packing is that the uniform feeding of the cotton throughout the length of the respective hoppers is rendered impossible. This objection is well known and appreciated by every practical ginner. In fact, it is customary to provide narrow slots in the bottom of each feeder hopper and extending the full length thereof, so that the cotton can be manually distributed by means of a bar or stick in order to effect feeding of the cotton uniformly throughout the length of the hopper and the gin. The screw, or helical, type of distributor is likewise objectionable in that it tends to pack the cotton up in one end of the feeder hopper; also the screw type conveyor must be very large in order to be effective and hence its expense is great. Also, where the conveyor is made long to serve a battery of several feeders and gins, a number of bearings must be provided. These bearings obviously interrupt the continuity of the conveyor and constitute obstructions to the passage of the cotton.

My invention, therefore, has for its primary object to overcome the aforementioned disadvantages of the belt and screw type of distributor, and to provide a very simple, durable, inexpensive and highly efficient distributor construction which will supply the cotton in uniform volume throughout the length of the feeder hoppers and avoid packing or banking of the cotton in the remote ends thereof,—the nature of construction being such that repairs will seldom be required, but which, when necessary can be quickly made by the ordinary unskilled person.

Another object of the invention is to provide a distributor which, in its normal operation, serves to loosen and separate the locks of cotton without in any way damaging the fiber,—thus to materially assist the subsequent ginning process.

The invention also has for an object the provision, in a distributor, of novel cotton advancing means which will in nowise be injured by foreign objects which sometimes find their way into the distributor with the cotton.

The invention also resides in certain novel features of construction, combination and arrangement of the various parts, and in certain modes of operation, all of which will be readily apparent to those skilled in the art upon reference to the accompanying drawings in connection with the detailed descriptive matter appearing hereinafter.

It is understood that the drawings depict what now appears to be a preferred form of the invention. However, it is to be understood that the invention is susceptible of various changes and modifications within the spirit and scope of the subject matter claimed hereinafter.

In the drawings, wherein the same reference characters have been used to designate the same parts throughout the several views,—

Figure 1 is a front elevational view showing the application of my distributor to the hoppers of a pair of adjacent feeders forming a part of a battery;

Figure 2 is a longitudinal vertical sectional view through the device;

Figure 3 is a horizontal sectional view taken on the line 3—3 of Figure 2;

Figure 4 is a cross sectional view taken on the line 4—4 of Figure 2;

Figure 5 is a fragmentary side elevational view illustrating diagrammatically the action of the fingers which are carried by the crank-operated connecting rods;

Figure 6 is a cross sectional view through one of the connecting rods, and showing the fingers disposed in staggered series, and, Figure 7 is a fragmentary longitudinal sectional view illustrating a modified form of the invention.

Referring to the several figures of the drawings by reference characters, numeral 2 denotes a distributor casing having a top closure 2a, and which has its bottom provided with openings communicating with the hoppers 3 of the gin feeders 4,—it being noted that the casing 2 is supported upon the upper ends of the hoppers 3.

The feeders 4 will, of course, rest upon the subjacent gins (not shown) which are to be fed by the respective feeders. The gins will be, of course, arranged in battery or series. I have illustrated in Figure 1 merely two gin feeders. However, it will be apparent that any number may be provided and supplied by the single superposed distributor 2.

As best shown in Figures 3 and 4, the distributor casing 2 is provided with a chute 5 at one end providing the side inlet 5a for the cotton which may be received from a suitable dropper or conveyor so as to be fed into the trough or casing 2 beneath the propelling or advancing means contained therein. The openings communicating between the casing or distributor trough 2 and the feeder hoppers 3 are designated as at 6.

In carrying out the invention, I provide the trough with a number of transverse crank shafts 8, which are journalled in exterior bearings 7 and are provided with a plurality of cranks, as shown at 8a, 8b, 8c. The crank shafts 8 are spaced in the direction of the length of the trough or casing 2, as shown.

Corresponding cranks of each crank shaft 8 serve to support the connecting rods 9,—there being, as shown, a connecting rod 9 for each set of cranks. The connecting rods 9 provide bearings 9a for the cranks, 8a, 8b, 8c.

Each of the connecting rods 9 is provided with a lineal series of spring fingers 10, which are suitably spaced from one another in the direction of the length of the connecting rods, and serve to engage and actuate the cotton in a lengthwise direction toward the outlet end 2c of the trough or casing 2 as diagrammatically indicated in Figure 5.

The crank shafts 8 are driven by means of a belt 12 passed over the pulley or drive wheel 13, which is keyed to an extension of one of the crank shafts 8. Manifestly, the single drive will, through the connection of the various cranks by connecting rods 9, serve to operate the entire series of connecting rods.

As clearly disclosed in Figure 2, the cranks 8a, 8b, 8c are arranged at angles of approximately 120° with respect to each other. Thus, the connecting rods of the respective sets of cranks will be successively swung downwardly and forwardly in engagement with the bottom of the trough casing 2 and then raised upwardly and rearwardly to repeat the operation. Thus, there will be a continuous uniform advancing of the cotton in the casing toward the overflow end 2c, due to the fact that at all times during operation, two sets of fingers will be moving forwardly.

The letter A indicates the diagrammatic path of the fingers 10.

In Figure 6 a slightly modified form of finger is shown carried by the connecting rod 9. Here, the fingers 10' are staggered, so to speak. In other words, their outer ends are alternately flared in downwardly diverging relationship from the rod 9. This tends to avoid "grooving" the mass of cotton and accentuates the lateral pulling and separating action of the fingers.

It is believed to be obvious that the advancement of the cotton will effect an even distribution of the same in the hoppers or storage chambers 3 of the feeders. These chambers 3 may be provided with suitable valves for controlling the feed of the cotton to the feeder below. However, since the specific hopper 3 and feeder 4 form no part of the present invention, I have not thought it necessary to illustrate these instrumentalities in detail.

In actual practice, the excess cotton, if any, will be discharged through the outlet 2c, but such as may be discharged thereat can be brought around and again fed into the casing 2 through the passage 5a (Figure 4).

The distributor, here disclosed, very effectively operates to loosen and separate locks of cotton without damaging the fiber, and thus materially assists the subsequent ginning process.

The various sets of fingers loosen and separate the cotton fibers, in addition to advancing the same, by imparting a pull on the cotton in a direction laterally of the longitudinal planes of the rods 9. With respect to Figure 4, it will be apparent that as the left hand set of fingers moves forward each finger drags cotton behind it, pulling it in laterally from the space beneath the cranks 8b and 8a. Due to the resiliency of the fingers, the pulling force is exerted as a consistent tug on the cotton, which pulls the fibers apart.

While this action is taking place, the right hand set of fingers engages the cotton, and before the left hand set is disengaged. This right hand set then exerts a lateral tug tending to pull the fibers laterally from beneath the right hand and central sets, effecting a pull in the opposite direction.

Before the right hand set is disengaged the central set engages and tugs the cotton in from both left and right. Thus there is a constant tugging on the cotton to and fro as it advances, which very effectively loosens the fibers and pulls them apart.

The fingers 10 being resilient will not be damaged by the hard foreign objects which may find their way into the casing 2 with the cotton. The construction is very simple, the parts being reduced to a minimum. The distributor will be long lived and efficient in operation, and can be operated with a minimum of power,—it being apparent, as aforesaid, that the objections to the screw conveyor and belt conveyor will be readily met by my improved apparatus herein disclosed Figure 7 shows a modification in respect to the feeding of the cotton to the distributor. Here the inlet end of trough casing 50 terminates in a chute 55 so as to direct the incoming cotton beneath the crank shaft 53, cranks 54 and connecting rods 52. There is also disclosed an alternative or additional cotton supply or feeding conduit 51 in the top of the casing 50, whereby the cotton may be dropped down through the connecting rods 52.

Having thus described my invention, what I claim as new and desire to secure by Letters Patent is:

1. In a cotton distributor casing having an inlet and outlet, the combination of a set of flexible cotton-lock-loosening fingers arranged in staggered series lengthwise of said casing for actuating the cotton toward said outlet, and driving means for said set, the several fingers of said series being of elongated rod-like form capable of entering a mass of cotton fibers, and being flexible throughout their lengths for cooperation with one another in dragging the fibers laterally as they are advanced longitudinally, whereby to effectively loosen the fibers without injury thereto and without grooving the mass.

2. A cotton distributor for supplying gins and the like comprising in combination, a casing having an inlet adjacent one end and outlets in the bottom, several laterally spaced sets of flexible cotton-lock-loosening fingers extending lineally of said casing, the outer portions of the fingers of each set being disposed in substantially staggered relationship to one another, and means for successively engaging said finger sets with the cotton and successively moving the finger sets lengthwise of said casing to actuate the cotton to said outlets while loosening the cotton at different width-wise points of the casing, the several fingers of said series being of elongated rod-like form capable of entering a mass of cotton fibers, and being flexible throughout their lengths for cooperation with one another in dragging the fibers laterally as they are advanced longitudinally, whereby to effectively loosen the fibers without injury thereto and without grooving the mass.

3. Cotton fibre loosening and uniformly advancing means for the mass of cotton in a cotton distributor or the like comprising a pair of laterally spaced lineal series of flexible fingers, and means for moving said series of fingers to alternately engage and disengage the cotton, said fingers being of considerable length and flexible throughout whereby to effect repeated lateral movement of fibers in opposite directions to separate and loosen the same during advancement of the cotton without injuring the same and without grooving the mass.

4. Cotton fibre loosening and uniformly advancing means for the mass of cotton in a cotton distributor or the like comprising a pair of laterally spaced elongated fingers flexible throughout their lengths, and means for moving said fingers to alternately engage and disengage the cotton whereby to effect repeated lateral movement of fibres in opposite directions to separate and loosen the same during advancement of the cotton without injuring the same.

5. Cotton fibre loosening and uniformly advancing means for the mass of cotton in a cotton distributor or the like comprising a pair of laterally spaced lineal series of staggeredly disposed fingers, and means for rectilinearly driving said series of fingers to alternately engage and disengage the cotton, said fingers being of elongated, rod-like form and flexible throughout their lengths whereby to effect repeated lateral movement of fibres in opposite directions to separate and loosen the same during advancement of the cotton without injuring the same.

6. Cotton fibre loosening and uniformly advancing means for the mass of cotton in a cotton distributor or the like comprising a pair of laterally spaced lineal series of fingers, means for rectilinearly driving said series of fingers to alternately engage and disengage the cotton, said fingers being of elongated, rod-like form and flexible throughout their lengths whereby to effect repeated lateral movement of fibres in opposite directions to separate and loosen the same during advancement of the cotton without injuring the same, and certain fingers in at least one series being staggeredly disposed with respect to others in said series.

7. The method of conveying and separating locks of cotton, which consists in moving a mass of such cotton through a defined path, and at the same time applying a separating pull to the fibers thereof in a direction substantially lateral to that of the movement of the mass.

8. The method of conveying and separating locks of cotton, which consists in moving a mass of such cotton through a defined path, and at the same time alternately pulling the fibers thereof in opposite directions laterally of the direction of movement of the mass.

9. The method of conveying and separating locks of cotton, which consists in moving a mass of such cotton through a defined path, and at the same time pulling on the fibers thereof in opposite directions laterally of the direction of movement of the mass.

10. The method of conveying and separating locks of cotton, which consists in moving a mass of such cotton through a defined path, and at the same time simultaneously pulling on the fibers thereof in opposite directions laterally of the direction of movement of the mass, from points spaced apart over the area of the mass.

11. Cotton handling apparatus comprising a conduit, means for moving a mass of cotton therethrough, said means including spaced sets of resilient members arranged to penetrate a mass of cotton in the conduit, and means for causing said sets to engage and disengage the cotton in serial partially overlapping succession at points spaced apart transversely of the conduit, whereby to effect continuous internal lateral movement in the mass as it is being advanced.

12. In a cotton handling apparatus, a conduit, means for propelling a mass of cotton locks therethrough, and means associated with said propelling means for constantly pulling on the fibers of the mass in opposite directions laterally of the advancing direction of the mass, while the cotton is being advanced.

13. Cotton fiber loosening and advancing means for the mass of cotton in a cotton distributor or the like, comprising a plurality of elongated fingers spaced laterally apart, and means for moving said fingers through circular operating cycles in planes parallel to the axis of advancing movement of the cotton mass and alternately to engage and disengage the cotton, whereby to effect repeated lateral movement of fibers in opposite directions to separate and loosen the same during advancement of the cotton, without grooving the mass.

14. The method of conveying and separating locks of cotton, which consists in subjecting a mass of such cotton to the penetrating action of propelling members perpendicular to the axis of movement of the mass, and causing the members to move in circular operating cycles, through planes parallel to the axis of movement of the mass.

15. The method of conveying and separating locks of cotton, which consists in moving a mass of such cotton over a substantially flat surface, and pulling the fibers thereof apart during advancing movement of the mass, in planes perpendicular to the altitude of the mass.

NELSON B. HENRY.